July 27, 1965 R. A. DEHN 3,197,720

TRANSMISSION LINE HAVING FREQUENCY REJECT BAND

Filed Oct. 17, 1961

Inventor:
Rudolph A. Dehn,
by Richard R. Brainard
His Attorney.

United States Patent Office 3,197,720
Patented July 27, 1965

3,197,720
TRANSMISSION LINE HAVING FREQUENCY REJECT BAND

Rudolph A. Dehn, Schenectady, N.Y., assignor to General Electric Company, a corporation of New York Filed Oct. 17, 1961, Ser. No. 145,610
7 Claims. (Cl. 333—73)

Figure 1:
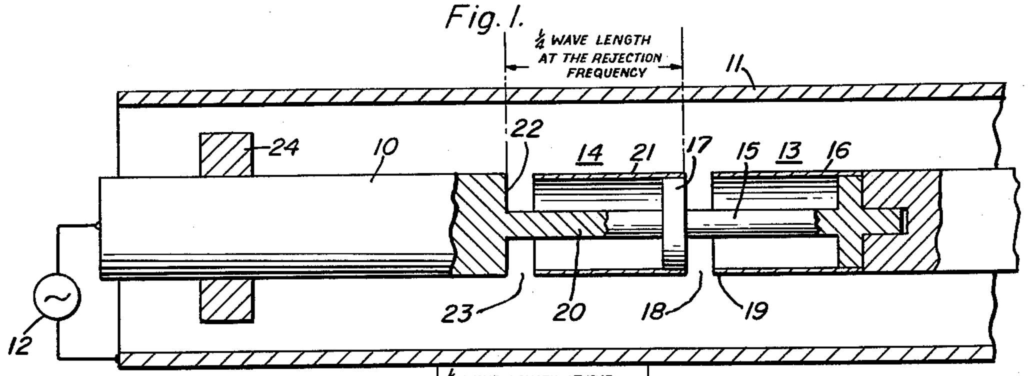

The present invention relates to an improved transmission line system for transmitting high frequency electrical energy at a desired frequency and rejecting energy at one or more undesired frequencies.

In transmission systems for supplying high frequency energy from a source to an electrical load at a desired frequency, it is usually desirable and sometimes essential that other frequencies be suppressed. For example, apparatus employing frequencies within a band which are permitted for a specific purpose cannot be permitted to transmit energy and to radiate it into space, for example, in af requency band which is assigned for other purposes. It is also desirable in suppressing energy at the unwanted frequency that it be done without interfering substantially with the transmission of energy at the desired frequency. It is also, in many cases, desirable that transmission at both the desired frequency and the frequencies to be rejected be operable over a reasonable band of frequencies. Accordingly, it is an important object of the present invention to provide an improved transmission line system having the desirable operating characteristics mentioned above.

In accordance with a specific embodiment of the invention, a two conductor transmission line system, specifically a concentric line transmission system, for transmitting energy between a source and a load at a given frequency, is provided with two filter circuits effectively in series with one conductor of the transmission line. These filter circuits are tuned to present a high impedance in series with the center conductor of the transmission line at the rejection frequency while simultaneously causing much less disturbance to the transmission of energy at the desired frequency. The load impedance will, in general, reflect a significant portion of the wave energy at the undesired frequency. The standing wave thus established on the transmission line may then result in a very high impedance appearing at the location of the filter element nearest the load. This condition will reduce the efficacy of this filter circuit, hence a second circuit is located an electrical distance of one quarter wavelength or an odd multiple thereof toward the energy source from the first circuit. This second filter is then at a point of low impedance at the rejection frequency and the series impedance offered at this point with the relatively low shunt impedance is effective to reject the unwanted frequency for which the filter circuits are tuned. In accordance with another feature of the invention, the series impedance of these filter circuits with respect to the desired frequency is compensated for by an impedance located between the generator or source and the second of the filter circuits which essentially neutralizes the minor impedance mismatch caused by the rejection filters at the desired frequency. This mismatch may be balanced by a suitable shunt capacity element connected across the transmission line at a point on the transmission line where the effect of the filter circuits is equivalent to an inductive reactance at the desired frequency. The compensating impedance could also be an inductive reactance located one-quarter electrical wavelength from the point determined for the capacitive compensation. If there is but a single series inductance in the transmission line the capacitive impedance would be approximately one-half a wavelength toward the source measured at the desired frequency. With two or more filters the position will depend upon the series impedance offered by the filters and the location of the filter. The invention is equally applicable to other two conductor transmission line systems such as parallel wire transmission systems or the line over ground type of transmission systems. Also, filters may be employed for rejecting more than one frequency and more than two filters may be used for each frequency to be rejected.

Figure 2:
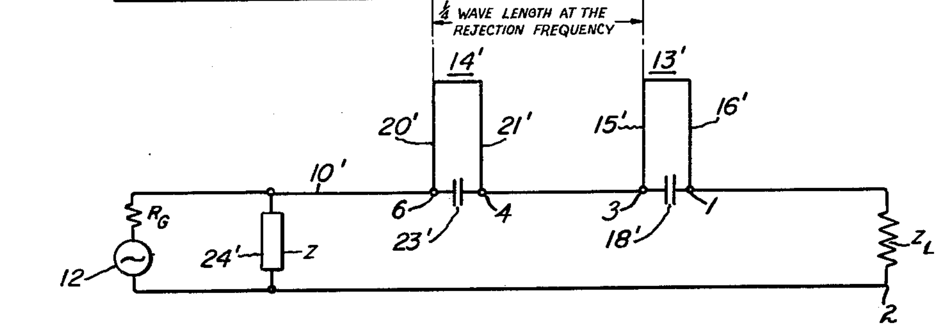

The features and advantages which characterize my invention will be better understood by reference to the accompanying drawing taken in connection with the following detailed description and its scope will be pointed out in the appended claims. In the drawing:

FIG. 1 is a sectional view of a concentric transmission line embodying my invention; and FIG. 2 is the schematic circuit representation of the circuit in FIG. 1 which is helpful in the explanation of the operation of the system of FIG. 1.

Referring now to the drawing, I have shown my improved transmission line system embodied in a transmission line of the concentric type including an inner conductor 10 and a spaced surrounding concentric conductor 11 for transmitting energy from a source of high frequency electrical energy 12 coupled to one end of the transmission line and operating at a desired frequency and a load circuit (not shown) coupled to the opposite end. The inner conductor of the transmission line is structurally shaped to provide two filter circuits 13 and 14 each including a capacitive impedance and an inductive impedance connected in parallel and in series with the center conductor 10. Referring to the drawing, filter element 13 includes a section 15 of substantially reduced cross section surrounded by a hollow conductor or skirt 16 the outer surface of which forms an extension of the center conductor and which terminates short of an adjacent portion of the central conductor 10 having its full diameter as designated at 17. The portion 16 terminates short of this portion to provide a gap 18 having a longitudinal dimension which is only a fraction of the length of the portion 16. This gap 18 introduces the predominantly capacitive impedance of the filter element 13 and the current path from the center conductor around the inner surface of the skirt or surrounding portion 16 to the outer surface of this portion at 19 forms the predominantly inductive portion of the circuit connected in parallel with the capacity provided by the gap 18. In a similar manner, the filter 14 is provided with a reduced section of center conductor 20, a surrounding conductor 21 having the same outer diameter as the unmodified central conductor 10, terminating short of the surface 22 of the center conductor to provide a gap 23 which provides the predominantly capacitive impedance of the filter 14. The filter 13 is located toward the load end of the transmission line and since the impedance of the load at the rejection frequency may be very substantially different from the characteristic impedance of the line, the filter 13 may be located at a high impedance point at the rejection frequency. This would be the severest operating condition and without fixing a single load impedance into which the device would work, it is entirely possible that such a condition would be encountered. If this impedance is high, then the rejection accomplished by a single series impedance would be correspondingly reduced. To overcome this and to provide for more effective rejection, the second filter 14 is provided in the transmission line on the source side of the first filter and a distance therefrom corresponding to approximately 90 electrical degrees or an odd multiple thereof at the rejection frequency. The impedance seen by this filter is then low and substantial rejection will be accomplished. Additional tuned filters each spaced approximately 90 electrical degrees or an odd multiple thereof at the rejection frequency from the preceding one and in a direction toward the source may be employed and each of these will see a low impedance and accomplish effective reduction in the frequency component to be rejected. An increase in the number of filters, however, tends to reduce the band width over which the rejection is effective.

Since the filters 13 and 14 tend to introduce an amount of series impedance at the desired frequency, this impedance can be compensated for by a suitably positioned shunt impedance which in the particular embodiment illustrated is in the form of a shunt capacitance provided by the conducting element or flange 24 extending outwardly from the center conductor 22. This capacitive ring is located at a point between the source and filter 14 where the effective reactance of the filter elements, at the desired frequency is inductive. By making this shunt capacity of suitable size, the effect of the inductance introduced by the series filters 13 and 14 may be neutralized at the desired frequency. If the rejection frequency is a harmonic of the fundamental, then the impedance presented by filters 13 and 14 at the fundamental is inductive. It will be apparent to those skilled in the art that the compensating impedance may be a shunt inductance which, for the harmonic rejection, would be located at a position where the combined impedance of the filters at fundamental frequency is capacitive.

In FIG. 2 the circuit shown in FIG. 1 has been represented schematically with lumped circuit elements and the various parts of the schematic circuit have been designated by the same reference numerals as the corresponding structural parts of FIG. 1 which predominantly contribute the lumped parameters. For example, the capacitance of capacitor 18′ is predominantly contributed by the gap 18 of FIG. 1. As shown in FIG. 2, the first filter circuit 13′ inserts a series impedance into the line at 1–3. However, since as stated above the line at 1–2 may exhibit a high impedance at the frequency to be rejected, the effectiveness of filter 13 in rejecting energy at this frequency may be limited. Accordingly, the second filter 14′ is inserted at a distance along the line towards the source which is approximately equal to 90 electrical degrees or an odd multiple thereof. As is well understood, if the impedance at the rejection frequency is high at the location 1–2, it will be low at a point 90° from that position and accordingly the impedance across the transmission line at 4–2 is relatively low and the high series impedance 6–4 of filter 14′ will be effective to greatly attenuate the energy at the unwanted frequency. The shunt impedance 24′ is of a type that is capacitive or inductive and at a location to compensate for the series impedance interposed by the filters 13′ and 14′ at the desired rejection frequency.

If it is desired to reject more than one frequency, additional filter circuits, and preferably at least two additional circuits, tuned to the additional frequency which it is desired to reject may be inserted in the line. In such case, only one compensating impedance such as shunt capacitor 24 is required and its impedance will be determined by the combined impedances of the filter circuits at the wanted frequencies.

If the impedance of the load circuit is known and fixed, it will be appreciated that the filter elements may be located in positions of low impedance at the frequencies to be rejected and in such an event only one filter for each frequency to be rejected will be needed. This is a much simpler problem than that presented by a load of unknown or variable impedance such as may be encountered, for example, in the application of the transmission line to the supply of energy to a high frequency oven where the food to be cooked constitutes a portion of the load impedance.

While I have shown and described a particular embodiment of my invention, it will be apparent to those skilled in the art that other modifications may be made and I aim, therefore, in the appended claims to cover all such modifications as fall within the true spirit and scope of my invention.

What I claim as new and desire to secure by Letters Patent of the United States is:

1. A transmission line system for transmitting high frequency electrical energy at a desired frequency between a source and a load circuit connected to the transmission line and rejecting energy at a rejection frequency comprising a pair of parallel conductors, a pair of filter circuits connected in series with said transmission line in spaced relation along the transmission line and each comprising a pair of parallel impedances tuned to resonance at the rejection frequency, the first of said filter circuits being located on said transmission line nearer said load circuit, and the second of said filter circuits being located on said transmission line at a position nearer the end thereof to which the source is connected by approximately 90 electrical degrees or an odd multiple thereof at the rejection frequency and impedance means located in said line on the side of said second filter circuit remote from said first filter circuit for compensating at the desired frequency for impedance inserted in said transmission line by said filter circuits.

2. In combination, a source of high frequency electrical energy, a load circuit, a transmission line system interconnecting said source and said load circuit for transmitting high frequency electrical energy from said source to said load circuit at a desired frequency and rejecting energy at a rejection frequency comprising a pair of parallel conductors, and a pair of filter circuits connected in series with one conductor of said transmission line in spaced relation along said line and each comprising parallel connected inductance and capacitance impedances tuned to resonance at the rejection frequency, one of said filter circuits being located on said transmission line nearer said load circuit, and the second of said filter circuits being located on said transmission line at a position nearer the end thereof to which said source is connected by approximately an odd multiple of 90 electrical degrees at the rejection frequency.

3. A transmission line system for transmitting high frequency electrical energy at a desired frequency between a source and a load circuit connected to the transmission line and rejecting energy at a rejection frequency comprising a pair of parallel conductors, a pair of filter circuits connected in series with said transmission line in spaced relation along the transmission line and each comprising a pair of parallel impedances tuned to resonance at the rejection frequency, one of said filter circuits being located on said transmission line nearer said load circuit, and the second of said filter circuits being located on said transmission line at a position nearer the end thereof to which the source is connected by approximately an odd multiple of 90 electrical degrees at the rejection frequency and capacitance impedance means located in said line on the side of said second filter circuit remote from said first filter circuit at a point where the combined impedance of said filter is inductive for compensating at the desired frequency for impedance inserted in said transmission line by said filter circuits.

4. A concentric transmission line system for transmitting high frequency electrical energy at a desired frequency between a source and a load circuit connected to the transmission line and rejecting energy at a rejection frequency comprising a pair of concentric conductors, a pair of filter circuits in series with the center conductor of said transmission line in spaced relation and each comprising parallel connected inductive and capacitive impedances tuned to resonance at the rejection frequency, one of said filter circuits being located on said transmission line nearer said load circuit, and the second of said filter circuits being located on said transmission line at a position nearer the end thereof to which the source is connected by an odd multiple of approximately 90 electrical degrees at the rejection frequency and impedance means located in said line on the side of said second filter circuit remote from said first filter circuit for compensating at the desired frequency for the impedance inserted in said transmission line by said filter circuits.

5. In combination, a source of high frequency electrical energy, a load circuit, a concentric transmission line system interconnecting said source and said load circuit for transmitting high frequency electrical energy from said source to said load circuit at a desired frequency and rejecting energy at a rejection frequency comprising a pair of concentric conductors, and a pair of filter circuits connected in series with the center conductor, said transmission line in spaced relation and each comprising a pair of parallel connected impedances tuned to resonance at the rejection frequency, one of said filter circuits being located on said transmission line nearer said load circuit, and the second of said filter circuits being located on said transmission line at a position nearer the end thereof to which the source is connected by an odd multiple of approximately 90 electrical degrees at the rejection frequency.

6. A transmission line system for transmitting high frequency electrical energy at a desired frequency between a source and a load circuit connected to the transmission line and rejecting energy at a rejection frequency comprising a pair of parallel conductors, a pair of filter circuits connected in series with one conductor of said transmission line in spaced relation along the length of the line and each comprising an elongated section of reduced cross section on the longitudinal center line of said one conductor and a second portion spaced outwardly from said section of reduced cross section and forming at one end a continuation of said one conductor and terminating in longitudinally spaced relation to said one conductor to provide in each filter a pair of parallel connected impedances tuned to resonance at the rejection frequency, one of said filter circuits being located on said transmission line nearer said load circuit, and the second of said filter circuits being located on said transmission line at a position nearer the end thereof to which the source is connected by approximately an odd multiple of 90 electrical degrees at the rejection frequency and impedance means located in said line on the side of said second filter circuit remote from said first filter circuit for compensating at the desired frequency for impedance inserted in said transmission line by said filter circuits.

7. A transmission line system for transmitting high frequency electrical energy at a desired frequency between a source and a load circuit connected to the transmission line and rejecting energy at a rejection frequency comprising a pair of parallel conductors, a filter circuit including a pair of parallel impedance elements tuned to resonance at the rejection frequency connected in series with one conductor of said transmission line at a location where the impedance of the line at said rejection frequency is low and impedance means located in said line on the side of said filter circuit remote from the load circuit for compensating at the desired frequency for impedance inserted in said transmission line by said filter circuit.

References Cited by the Examiner

UNITED STATES PATENTS

| | | | |
|---|---|---|---|
| 2,178,299 | 10/39 | Dallenbach | 333—73 |
| 2,183,123 | 12/39 | Mason | 333—75 |
| 2,270,416 | 1/42 | Cork | 333—73 |
| 2,297,512 | 9/42 | Von Baever | 333—73 |
| 2,408,927 | 10/46 | Gurewitsch | 333—73 |
| 2,411,299 | 11/46 | Sloan | 333—73 |
| 2,421,033 | 5/47 | Mason | 333—73 |
| 2,438,367 | 3/48 | Keister | 333—73 |
| 2,470,805 | 5/49 | Collard | 333—73 |
| 2,515,061 | 7/50 | Smith | 333—73 |
| 2,557,567 | 6/51 | Rumsey et al. | 333—73 |
| 2,686,903 | 8/54 | Pan | 333—73 |
| 2,724,806 | 11/55 | Tillotson | 333—73 |
| 2,816,270 | 12/57 | Lewis | 333—73 |

HERMAN KARL SAALBACH, *Primary Examiner.*